L. MELLETT AND T. CURRAN.
FENDER FOR MOTOR DRIVEN VEHICLES.
APPLICATION FILED NOV. 29, 1920.
1,408,117.
Patented Feb. 28, 1922.
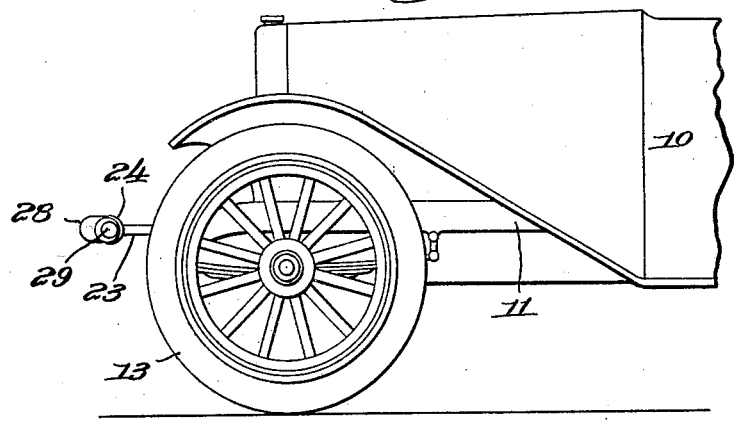
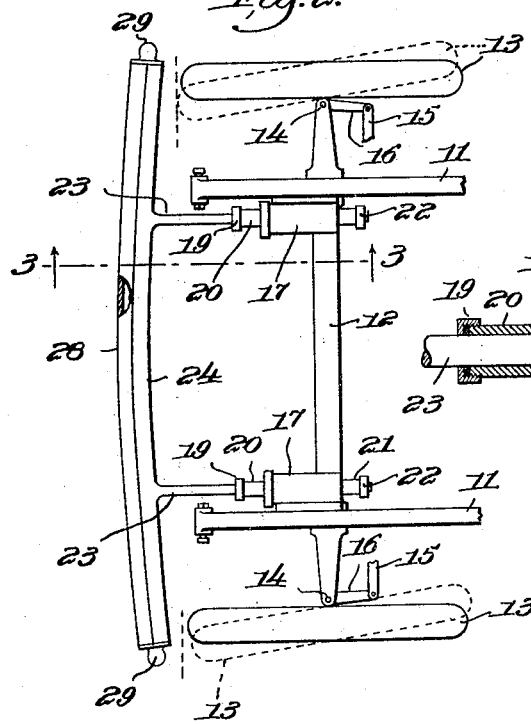
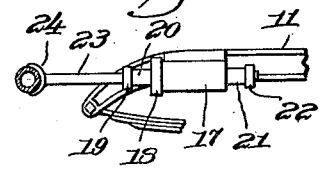
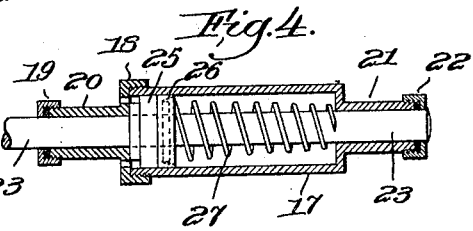

UNITED STATES PATENT OFFICE.

LEMUEL MELLETT AND TIMOTHY CURRAN, OF WATERTOWN, MASSACHUSETTS; SAID CURRAN ASSIGNOR OF HIS ENTIRE RIGHT TO WILLIAM T. BEATTIE, OF ARLINGTON, MASSACHUSETTS.

FENDER FOR MOTOR-DRIVEN VEHICLES.

1,408,117.   Specification of Letters Patent.   Patented Feb. 28, 1922.

Application filed November 29, 1920. Serial No. 427,120.

*To all whom it may concern:*

Be it known that we, LEMUEL MELLET and TIMOTHY CURRAN, citizens of the United States of America, and residents of Watertown, in the county of Middlesex and Commonwealth of Massachusetts, have invented certain new and useful Improvements in Fenders for Motor-Driven Vehicles, of which the following is a specification.

This invention relates to fenders such as are commonly used on motor driven vehicles.

An object of the invention is to produce a fender that is simple and cheap to manufacture and yet ornamental rather than detracting in appearance.

A further object of the invention is to produce a fender that is practical in its action and so constructed and arranged as to afford three cushioning mediums being called into play in succession, as follows: the cushioned fender bar, air compression cylinders and the inflated tires of the vehicle, to thus, by stages, break the force of heavy impact caused by collision.

Another object of the invention is to so construct certain parts of the cushioning devices that two of the mediums only will be brought into play in succession, in which case the impact is first received by an element that is so designed as to yield and not mar or scratch the colliding body and thereafter transmit the force of the impact to other devices which effectively act as force resisting means increasing in effect in proportion to the force of impact.

It is a still further object of this invention to so regulate the cushioning devices just mentioned that in extreme cases of heavy impact the initial and secondary cushioning means will act to relieve the damaging force of the impact and will also provide sufficient reactionary energy to cause a separation of the colliding bodies.

Another object of the invention is to so arrange and regulate the secondary cushioning means as to allow the fender bar to be eased rearwardly upon impact to such extent that the rear face of the bar will engage the inflated tires of the wheel to which it will transmit the force of the impact and in the event of the wheels being turned from a straight path the fender bar will gently contact therewith and force it back to its straight path and in so doing will turn the other wheel likewise. The object of this action being to straighten the wheels in the direction of the body of the vehicle so that in the event of impact being exceptionally heavy and the tendency of the vehicle to rebound, it will do so in a straight path and obviate the possibility of overturning.

To the attainment of the above objects the invention consists in a fender bar having a resilient or shock reducing or cushioning means on the face thereof, and laterally extending rods having piston heads thereon encased in air compression cylinders. Means being employed to regulate the partial or non-escape of air behind the piston heads and means in said cylinders to normally retain the bar in its forward or shock receiving position and thus eliminate unnecessary rattle.

The invention further consists in certain novel features of construction and arrangement of parts which will be fully understood by reference to the description of the drawings and the claims hereinafter given.

Of the drawings:

Figure 1 represents in side elevation a sufficient portion of a motor vehicle to enable this invention to be understood.

Figure 2 a top plan view of Figure 1, certain of the parts being left out for purposes of illustration.

Figure 3 a detail partly in section taken on the line 3—3 Figure 1.

Figure 4 an enlarged detail section through one of the air compressing cylinders.

Referring to the drawings:

A motor vehicle 10 of any well known type or design having the chassis 11, axle 12 to which by usual or suitable means the wheels 13 are pivoted at 14 and under compulsion to turn simultaneously by reason of the rod 15 connecting the levers 16 extending rearwardly from the pivotal member of the wheels 13.

Fast to the chassis 11 or at any other effective or convenient part of the vehicle 10 are the air compressing cylinders 17, simple in construction, which at their left ends (see Fig. 4) are provided with removable caps 18 which may or may not have packing glands 19, at the left ends of the elongated bearings 20, forming part of said caps. At the right of the cylinders 17 and extending therefrom are the elongated bearings 21, the ends thereof being fitted with packing glands 22 for a purpose to be described.

The cylinders 17 are adapted to receive piston-like extensions 23 of a fender bar 24, said extensions being provided with piston heads 25, one of which is shown (see Figure 4) and the usual tight packing 26.

Normally the parts are in the position shown in the drawings, the fender bar 24 being held in forward or shock receiving position by means of the conically wound springs 27 which are so made as to occupy the minimum amount of space in the cylinders 17 when under compression.

Suitably secured to the fender bar 24 is the so-called initial shock receiving member 28, which may be, and preferably is, cylindrical in shape and resilient and non-abrasive in nature.

In this instance the said member 28 is represented as an inflated hollow tube, its ends being closed by plugs 29 suitably secured thereto and which may be ornamental in design.

In the event of collision between a vehicle thus equipped and another body it will be obvious that the protruding fender bar 24 will be the first object to receive the impact and if very slight the resilient member 28 will yield sufficiently to prevent damage. If, however, the impact is quite heavy, other devices will be called upon to add their quota of force or impact resisting means in conjunction with the member 28.

At this point let it be said that this invention includes means to control the movement of bar 24 as to whether it will be regulated to permit the force of heavy impact to cause it to contact with the inflated tires of the wheel or whether such contact will be eliminated and dependence placed upon the initial and secondary cushioning means only. If the first condition is required the packing glands 22 will be slightly unscrewed to relieve the pressure of the packing from the pistons 23 and it will be understood that the said pistons are not fitted to bearings 21 any closer than is required for a free running fit, which means in this instance that air under compression would find its way through the bearings 21 past the glands 22 into the open.

The glands having been adjusted and heavy impact upon being imposed upon the bar 24 will be slightly absorbed by the member 28 but not sufficiently to withstand the force thereof; consequently the pistons 23 will be forced into the cylinders 17 compressing the air therein which is forced through the bearings 21 until such time as the bar 24 meets the inflated tires of the wheels 13, straightening them if they are turned, at which time if the force of the impact has not been entirely absorbed, rebound or backward movement of the vehicle must take place. In the event of rebound of the vehicle the wheels 13 will have been straightened so that the movement thereof will be a safe one and not conducive to overturning the vehicle. On the other hand, if it is desired to take advantage of the first and second cushioning means only the glands 22 will be set up to their highest point of efficiency, thereby preventing the escape of the compressed air and thereupon when heavy impact takes place the member 28 will, as before, absorb a portion of the shock which will thereafter be transferred to the pistons 23 and air compression will immediately commence. Under this condition the movement of the pistons will be necessarily limited and energy in the form of highly compressed air will be built up in the cylinders, which must and will react either by moving the vehicle backward in the general direction of impact or by causing rebound to the colliding body.

It will be noticed that the bearings 20 and 21 are quite a distance apart and in practice will be as much so as can be consistently, while the cylinders 17 will be as close to the bar 24 as practical operation and application to the vehicle will permit. It is deemed advisable to give the piston 23 the greatest bearing length possible and to shorten the distance from the bar to the cylinders for the purpose of eliminating the cramping tendency of the pistons and to increase the strength or resisting power of the device when in collision the vehicle meets a body at an oblique angle.

It is obvious that it is the intention to so construct the fender that it may be applied to existing vehicles at small expense and therefore it is not the intention to limit this invention to the precise construction and arrangement herein shown and described as it may be changed without departing from the spirit and scope of the invention.

Having described the invention we claim:

1. In a device of the class described, a fender bar; means thereon resilient in nature adapted to absorb shock; means coacting with said bar to further successively absorb shock; and means to permit successive contact of said bar with other shock absorbing means.

2. In a device of the class described, a fender bar; means thereon adapted to absorb shock; means coacting with said bar to further successively absorb shock; means to permit successive contact of said bar with other shock absorbing means; and means to maintain said bar in shock receiving position.

3. In a device of the class described, a fender bar provided with means to absorb shock; a secondary shock absorbing means;

and a tertiary shock absorbing means, each of said absorbing means acting in succession in the order named.

4. In a device of the class described, a fender bar provided with means to absorb shock; a secondary shock absorbing means adapted to act successively to said first shock-absorbing means; a tertiary shock absorbing means adapted to act successively to said secondary shock-absorbing means; and means to normally retain said bar in shock receiving position.

5. In a device of the class described, a vehicle body; a chassis; wheels thereon provided with resilient tires; a fender bar provided with resilient means adapted to absorb shock; means coacting with said bar adapted to further successively absorb shock; and means to permit said bar to contact with said resilient tires.

6. In a device of the class described, a vehicle body; a chassis; wheels pivotally mounted thereon provided with resilient tires; a fender bar provided with a shock absorbing medium; air chambers coacting with said bar adapted to compress the air therein upon rearward movement of said bar; and means to permit said bar to contact with said resilient tires.

7. In a device of the class described, a vehicle body; a chassis; a fender bar having a resilient shock absorbing means thereon; a secondary cushioning means coacting with said bar also adapted to successively absorb the force of impact and simultaneously generate energy to cause rebound of the vehicle.

8. In a device of the class described; a vehicle body; a chassis; a fender bar having a resilient shock absorbing means thereon composed of an inflated tubular member; secondary shock absorbing mediums consisting of air compressing cylinders; means to compress the air in said cylinders in unison upon rearward movement of said bar; and means to normally retain said bar in shock receiving position.

9. In a device of the class described, a chassis; a fender bar having an inflated shock absorbing medium fast thereon; pistons rigidly attached to and extending from said bar; cylinders adapted to compress air coacting with said pistons; and means to regulate the compression of air in said cylinders.

10. In a device of the class described, a chassis; a fender bar having an inflated tubular member fast therewith; pistons extending from said bar; air compression cylinders adapted to coact with said pistons; and means to regulate the escape or non-escape of air under compression in said cylinders.

11. In a vehicle fender of the class described, a vehicle; wheels thereon; a primary shock absorbing means consisting of an inflated tubular member mounted on a fender bar; a secondary shock absorbing means consisting of a pair of air compressing cylinders adapted to act in conjunction with pistons fast with said bar to compress air; and a tertiary shock absorbing means adapted to contact with said bar, consisting of existing inflated tires on said wheels, whereby said contact will cause said wheels to line up with said chassis and cause a rearward straight line movement to said vehicle.

12. In a vehicle fender of the class described, a vehicle; wheels thereon; inflated tires thereon; means to effect the absorption of collision shock in three stages through the agency of compressed air, one of said means being a fender bar having an inflated tube on the face thereof, another of said means being the inflated tires on said wheels; and an air compressing medium intermediate said bar and said tires.

13. In a device of the class described, a vehicle; wheels on said vehicle having resilient tires thereon; a fender bar situated above the center of rotation of said wheels; shock absorbing means intermediate said bar and said tires; and means whereby said shock-absorbing means may permit impact between said bar and said tires.

14. In a device of the class described, a chassis; a fender bar; air compressing cylinders adapted to coact with said bar to absorb shock; rods extending from said bar through said cylinders and having bearings at both ends of said cylinders, pistons fast with said rods in said cylinders adapted to compress the air therein upon rearward movement of said bar; and means to normally maintain said bar in shock receiving position.

Signed by us at Watertown, Massachusets, this 26th day of November 1920.

LEMUEL MELLETT.
TIMOTHY CURRAN.